United States Patent [19]

Meyer et al.

[11] Patent Number: 5,115,537
[45] Date of Patent: May 26, 1992

[54] DRIVE SYSTEM

[75] Inventors: Robert B. Meyer, Middleburg Hts.; John R. Lackner, Westlake; Hans J. Matuschek, Parma, all of Ohio

[73] Assignee: The Scott Fetzer Company, Cleveland, Ohio

[21] Appl. No.: 708,735

[22] Filed: May 31, 1991

Related U.S. Application Data

[62] Division of Ser. No. 442,615, Nov. 29, 1989, abandoned.

[51] Int. Cl.⁵ .................................................. A47L 9/00
[52] U.S. Cl. ..................................... 15/340.2; 15/329; 180/19.3
[58] Field of Search .......................... 15/340.2, 329; 180/19.3

[56] References Cited

U.S. PATENT DOCUMENTS

| | | | |
|---|---|---|---|
| 2,814,063 | 11/1957 | Ripple | 15/340.2 X |
| 2,950,772 | 8/1960 | Dostal et al. | 15/340.2 X |
| 4,249,281 | 2/1981 | Meyer et al. | 15/340.2 |
| 4,347,643 | 9/1982 | Bair | 15/340.2 |

*Primary Examiner*—Chris K. Moore
*Attorney, Agent, or Firm*—Watts, Hoffmann, Fisher & Heinke Co.

[57] ABSTRACT

A vacuum cleaner having an improved transmission. The transmission includes speed reduction gearing and forward and reverse clutching elements which provide high power capacity, large speed reduction, durability, quiet operation and smooth power engagement. The main power train elements all rotate on parallel axes and the forward and reverse clutching elements are essentially independent of one another and resistant to wear. The transmission has an actuating mechanism which is connected to an upright handle on the vacuum cleaner and allows the appliance to respond to moderate pushing or pulling forces applied to the handle by the user. The vacuum cleaner also has improved bearings for rotatably supporting the wheel shaft of the appliance and aligning itself to the housing of the appliance.

16 Claims, 8 Drawing Sheets

DRIVE SYSTEM

This is a division of Ser. No. 07/442,615, filed Nov. 29, 1989, now abandoned.

BACKGROUND OF THE INVENTION

The invention relates to vacuum cleaners, and more specifically to a vacuum cleaner having an improved drive system.

Handle manipulated self-mobilized wheeled appliances such as vacuum cleaners, sweepers, lawn mowers and carts are well known. U.S. Pat. Nos. 3,618,687 to Ripple et al., 4,249,281 to Meyer et al., 4,347,643 to Bair III and 4,434,865 to Tschudy et al., for example, illustrate transmissions for vacuum cleaners.

Known drive systems for these and like appliances can have one or more disadvantages of limited power capacity, inadequate speed ranges, low durability, noisy operation, limited speed reduction ratio necessitating relatively small traction wheels, expensive componentry and/or non-uniform response and power application.

SUMMARY OF THE INVENTION

The invention provides a transmission assembly for a handle controlled wheeled appliance that has a high power output capacity, is durable and quiet in use and which delivers smooth application of power in both forward and reverse directions. The disclosed transmission arrangement includes a first stage of speed reduction in the coupling of a drive motor and a transmission input shaft interconnected by sprockets and a primary drive belt. A pinion on the input shaft drives one of a pair of meshed counter-rotating gears. A clutch/sprocket is associated with each of the counter-rotating gears and a belt couples both of these clutch/sprockets to a common sprocket which through associated elements drives the wheels of the appliance. The input pinion, counter-rotating gears, respective clutch/sprockets and common output sprocket all rotate about axes parallel to the motor shaft. An actuating mechanism selectively energizes one or the other of the clutch/sprockets for forward or reverse propulsion of the appliance.

The disclosed drive system is particularly suited for use in a vacuum cleaner where it is driven off the shaft of the fan motor. The transmission provides a relatively high speed reduction ratio to readily accommodate the characteristically high speed of the fan motor and provide a wheel shaft output speed that makes practical the use of relatively large traction wheels. Such large traction wheels afford improved operation over a variety of floor surfaces.

The actuating mechanism of the transmission is connected to the upright handle of the cleaner and allows the appliance to respond to moderate pushing or pulling forces applied to the handle by the user to initiate, respectively, forward and reverse propulsion. Moreover, the speed at which the cleaner is driven is proportional to force applied to handle by user, in both forward and reverse directions.

The disclosed actuating mechanism and clutching elements provide a smooth application of power in either the forward or reverse directions and this response is generally unaffected by wear over long periods of use. Each of the clutch/sprockets includes an enlarged flange that affords a correspondingly large friction surface and a central bore that receives an associated biasing spring and thereby contributes to a savings in the size of the transmission.

An additional feature of the disclosed transmission is a wheel shaft bearing construction which serves to locate the case of the transmission relative to the housing body of the appliance and which serves to support the weight of the appliance on the wheel shaft without imposing this weight or shock loads on the transmission itself.

DESCRIPTION OF THE PREFERRED EMBODIMENT

Figure 1:
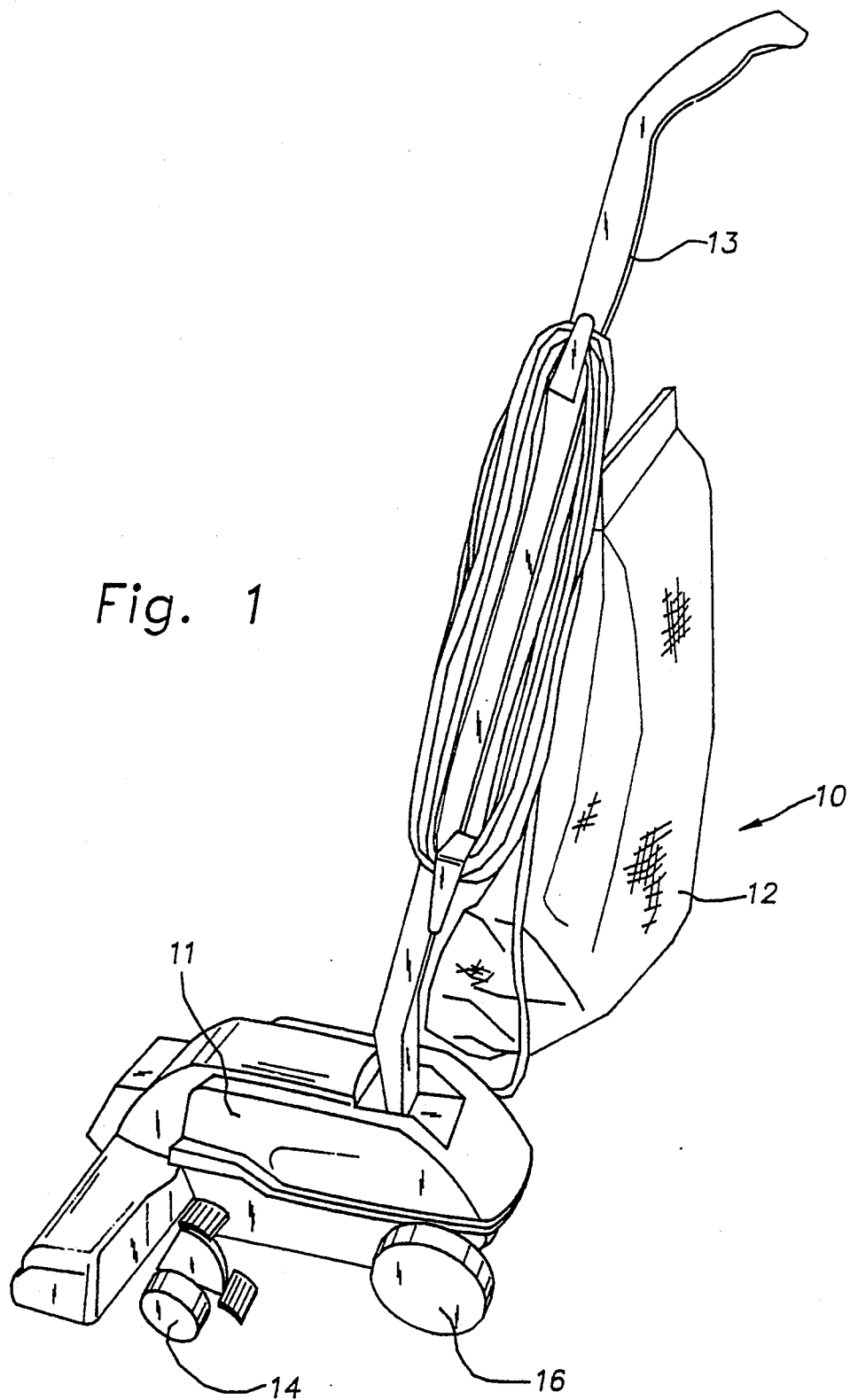
FIG. 1 is a perspective view of a vacuum cleaner constructed in accordance with the present invention.
Figure 2:
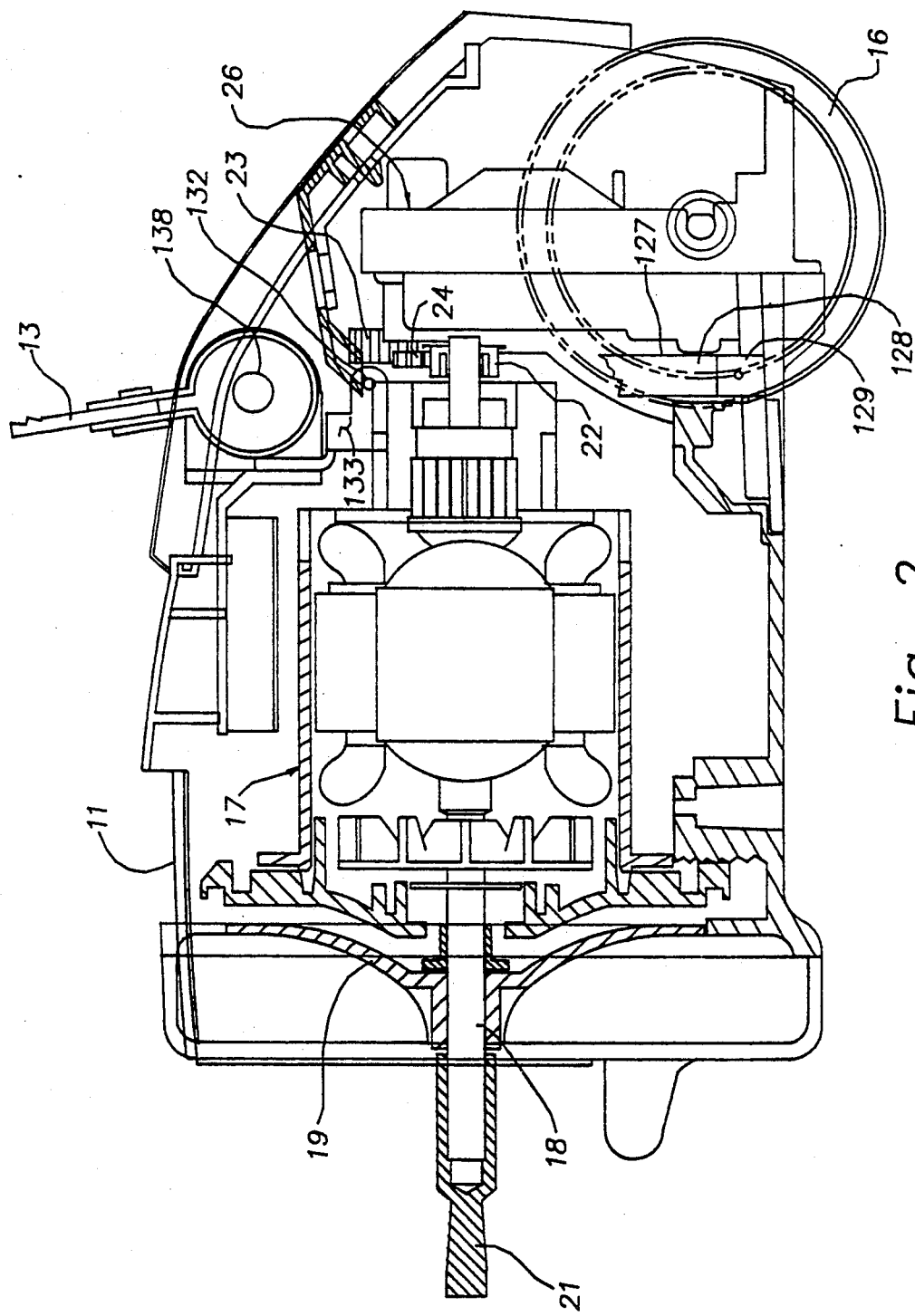
FIG. 2 is a simplified partial cross-sectional view taken in a vertical plane through the housing of the vacuum cleaner.

FIG. 1 illustrates a vacuum cleaner 10 including a housing 11, a bag 12 for collecting dirt and a handle 13 for manipulating the appliance across a floor surface. The cleaner 10 is supported on relatively small front wheels 14 and relatively large rear wheels 16. As shown in FIG. 2, an electric motor 17 is enclosed within the housing 11 and has a shaft 18 which, in the illustrated arrangement, is generally horizontal and parallel to the front-to-rear direction of the cleaner 10. On a front end of the motor shaft 18 there is a suction fan 19. The shaft 18 includes an extension 21 extending forwardly of the fan. In use a belt (not shown) engages the extension 21, driving a rotary agitator brush in a generally conventional manner.

Figure 3:
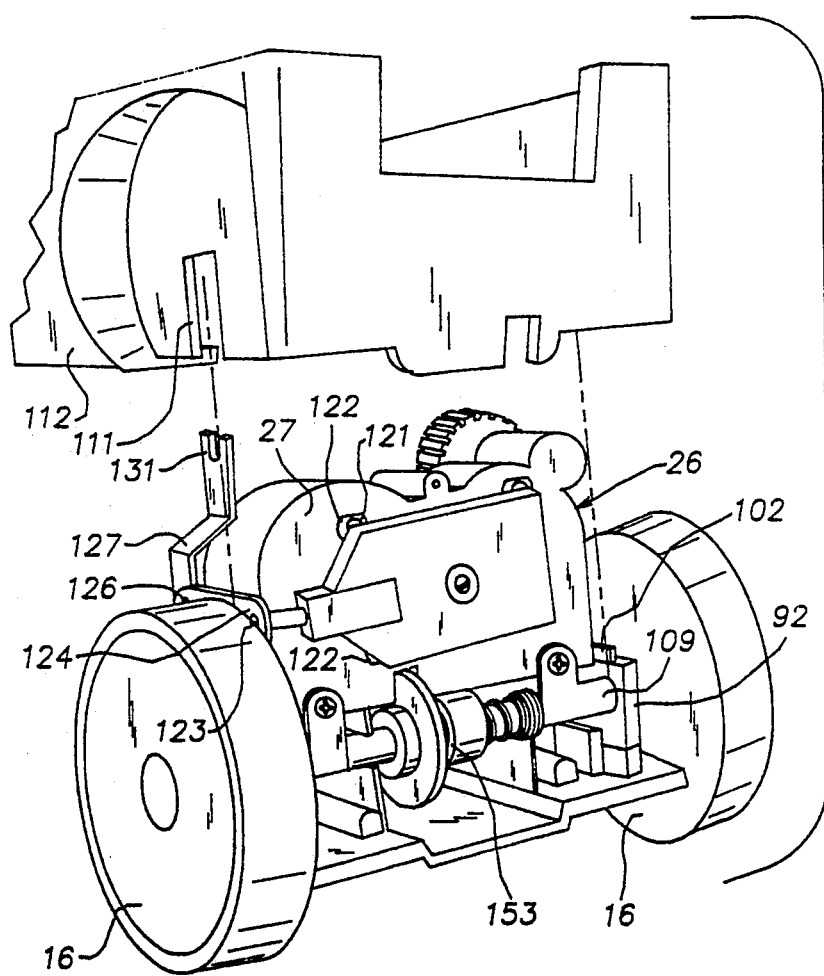
FIG. 3 is a rear perspective view of a transmission constructed in accordance with the invention in exploded relation to a portion of the housing of the vacuum cleaner.

A grooved sprocket 22 is fixed on a rear end of the motor shaft 18 and is coupled to a similar grooved sprocket 23 by a toothed belt 24. These sprockets 22, 23 and belt 24 provide the primary drive from the motor 17 to a transmission 26 that drives the rear traction wheels 16 from motive power derived from the motor. In the illustrated embodiment, the transmission 26 is a self-contained modular unit as illustrated in FIG. 3 and includes a casing 27 split in front and rear sections mating at a vertical plane indicated at 28 in FIG. 5. The sprocket 23 is carried on an input shaft 29 of the transmission. Within the casing 27 are various power transmitting elements that reduce the speed of the motor shaft and selectively provide forward and rearward rotary shaft output. These elements within the casing 27 all rotate about axes parallel to the axis of the motor shaft 18. More specifically, the input shaft 29 has fixed to it a pinion gear 31. The input shaft 29 rotates in a suitable bearing in a boss 30 of the front section of the casing 27 (FIG. 6). Meshed with the pinion gear 31 is a gear 33 which meshes with a substantially identical counter-rotating gear 34. The gears 33, 34 spin on cylindrical bearings 38 assembled on respective non-rotating shafts 36.

Figure 10:
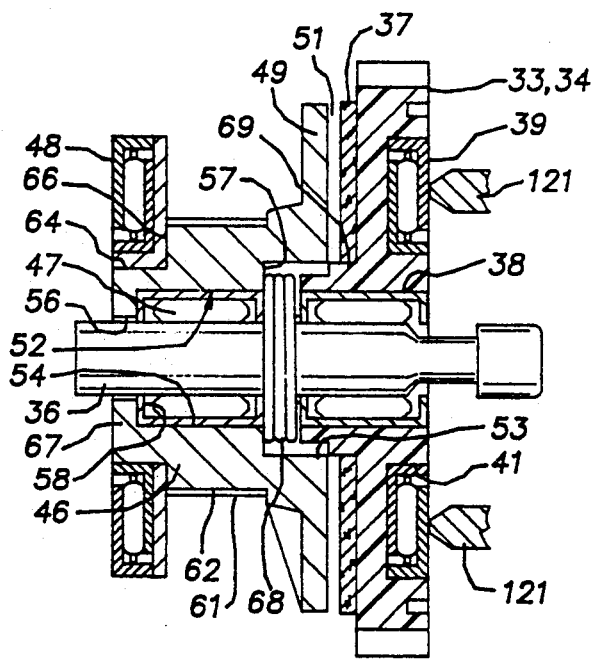
FIG. 10 is an enlarged view of a typical gear and clutch/sprocket set of the transmission.
Figure 13:
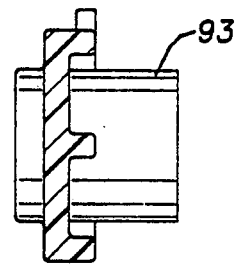
FIG. 13 is a cross-sectional view of the wheel shaft bearing taken in the vertical plane indicated by the line 13—13 of FIG. 11.
Figure 11:
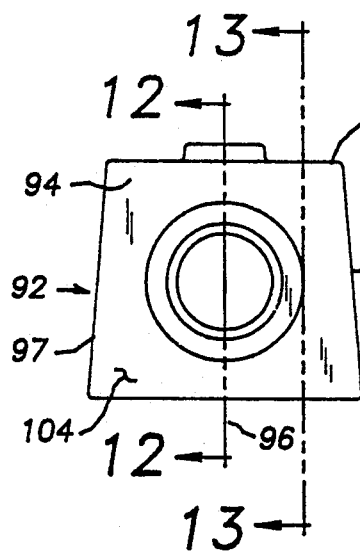
FIG. 11 is an end view of a wheel shaft bearing of the transmission.

With reference to FIG. 10, each gear has an annulus of friction facing material 37 suitably fixed to a radial face thereof. A thrust bearing assembly 39 is associated with each gear 33, 34. Each thrust bearing assembly 39 is of an anti-friction type, generally commercially available, which comprises a plurality of radially oriented rollers circumferentially spaced about the axis of the shaft between a pair of annular flat races. A flat annular pocket or recess 41 in a rear face of each gear 33, 34 receives the associated thrust bearing assembly 39 with a press fit.

A pair of clutch/sprocket members are provided. Each clutch/sprocket member 46 is associated with a corresponding one of the gears 33, 34. The clutch/sprocket members 46 are transmission output elements and are essentially identical and each is disposed in confronting relation to the respective clutch facing or plate 37. Each clutch/sprocket 46 is journaled on the associated shaft 36 by anti-friction bearing 47. A pair of the anti-friction thrust bearing assemblies 48 are provided. Each bearing like the bearings 39, is interposed between an associated one of the clutch/sprockets 46 and an associated wall area of the casing 27.

Each clutch/sprocket 46 includes a radially extending round flange 49 having an annular clutching surface 51 lying in a radial plane. The flange 49 forms the major diameter of the clutch/sprocket member and only a fraction of the axial length of the member 46. An axial bore 52 through the clutch/sprocket member 46 is stepped in diameter to provide successive counterbores 53, 54 and a clearance bore 56 for the shaft 36. Between the counterbores 53 and 54 is a radial surface 57 and, similarly, between the bores 54, 56 is a radial surface 58.

At a generally round exterior mid-zone 61, the clutch/sprocket 46 has uniformly spaced axially extending grooves 62 that cooperate with teeth in a drive belt 63. At an end remote from the flange 49, each clutch/sprocket member 46 has a cylindrical pilot surface 64 concentric with the axis of the bore 52 and adapted to support the thrust bearing assembly 48 which is assembled thereon. Each clutch/sprocket member has a radial shoulder 66 which engages a race of the associated thrust bearing assembly 48. Each shoulder 66 is disposed a predetermined distance from an end 67 of its clutch/sprocket member 46 which distance is less than the axial thickness of the bearing 48 so that the bearing will prevent member contact with an adjacent wall area of the casing 27.

Each counterbore 54 is proportioned to receive its associated bearing 47. It will be seen that each bearing 47 is in the same axial zone as the grooved mid-zone 61 that receives the belt 63. Each counterbore 53 is proportioned to receive an associated one of a pair of biasing compression springs 68 with the axial depth of this counterbore extending substantially to the zone surrounded by the grooved exterior 61.

As indicated in FIG. 10, each spring 68 bears against its associated radial surface or shoulder 57 at one end and at the other end against a race of its bearing assembly 38. Each spring 68 is dimensioned to bias the associated friction facing material 37 away from its clutching surface 51. Each gear 33 or 34 has a hub portion 69 which surrounds its counterbore 53. Each hub portion 69 has an exterior diameter somewhat larger than its associated grooved area 61. Each flange 49 has a diameter that is approximately twice that of the associated grooved section 61 and a length that is generally less than the grooved section. Preferably, the clutch/sprocket 46 is formed of a heat dissipating material such as aluminum so that it can conduct friction created heat away from the clutching surface 51.

Figure 5:
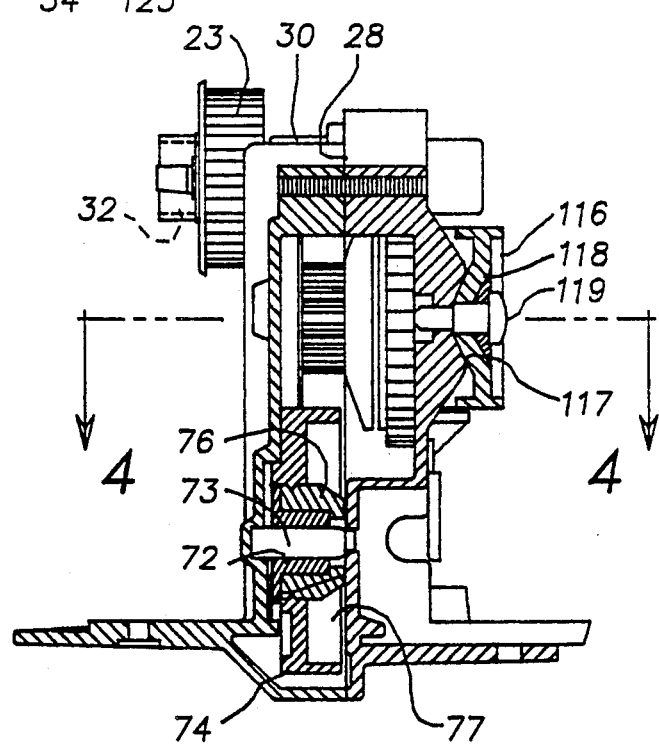
FIG. 5 is a cross-sectional view of the transmission taken in a central vertical plane.
Figure 6:
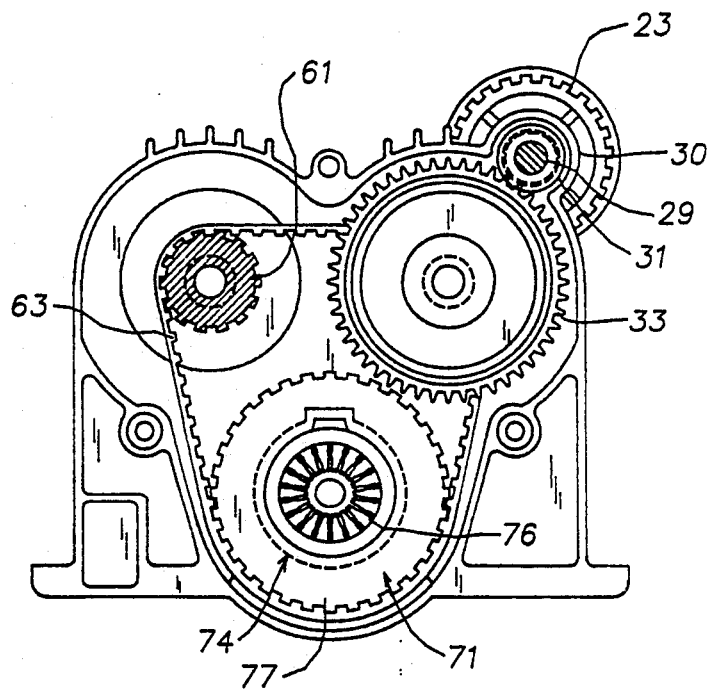
FIG. 6 is a schematic cross-sectional view of the transmission taken in the staggered plane indicated by the lines 6—6 in FIG. 4.

As best shown in FIGS. 5 and 6, a sprocket/gear unit 71 is journaled by a bearing 72 on a shaft 73. The axis of the shaft 73 is an imaginary vertical plane midway between the shafts 36. The sprocket/gear unit 71 has an annular radially outer sprocket rim part 74 that includes grooves on its outer periphery which mesh with the teeth of the belt 63. An inner periphery of the rim 74 is fixed as by a spline on the outer periphery of a bevel gear part 76 of the unit 71. A side of the rim 74 forms a hollow 77 and teeth of the bevel gear 76 are situated within this hollow.

A bevel gear 81 (FIG. 7) is in constant mesh with the bevel gear part 76 and is carried for rotation on a horizontal wheel shaft 82. The axis of the wheel shaft 82 is transverse to the axes of the previously described sprockets or pulleys and gears of the transmission 26. The rear traction wheels 16 are respectively mounted on end portions of the shaft 82 and keyed to prevent relative rotation. Also assembled on the wheel shaft 82 is a torque limiting coupling body 83, a compression spring 84 and opposed thrust bearings 86. The thrust bearings 86 are located by and bear against webs 87 formed on the transmission casing 27. The coupling body 83 is keyed to the shaft 82 by a cross pin 88 pressed in a hole in the shaft and received in an axially extending slot 89 in the side wall of the body 83. The bevel gear 81 and coupling body 83 have teeth at 90, 91 with surfaces that interengage in helical planes in a known manner.

Under ordinary circumstances, the spring 84 maintains the teeth 90, 91 interengaged so that the bevel gear 81 can apply a driving torque to the wheel shaft 82. However, when torque becomes excessive the compression spring yields to allow teeth 90, 91 to disengage and thereby decouple the bevel gear 81 from the wheel shaft 82 so that these later elements can rotate relative to one another. Limited axial movement of the coupling body 83 on the shaft 82 is permitted by the cross pin 88 and slot 89 while relative rotation between the shaft and body is precluded.

Bearings 92 on opposite sides of the casing 27 rotatably support the wheel shaft 82. The bearings 92, which are substantially identical, are shown in detail in FIGS. 11–14 inclusive. The bearings are preferably molded of a suitable self-lubricating material such as the thermoplastic material marketed by E. I. Dupont DeNemours & Co. under the trademark DELRIN AF.

Figure 12:
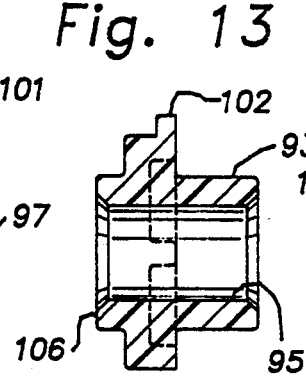
FIG. 12 is a vertical cross-sectional view of the wheel shaft bearing of the transmission taken in the plane indicated by the line 12—12 of FIG. 11.
Figure 14:
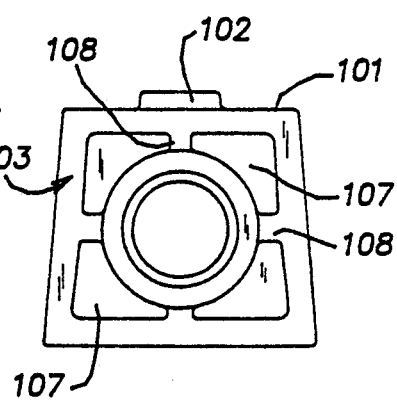
FIG. 14 is an end view of the wheel shaft bearing opposite the view of FIG. 11.

As best seen in FIG. 12, each bearing 92 has a generally cylindrical tubular body 93 and an integral trapezoidal flange section 94. A cylindrical bore 95 runs through the body 93 along an axis perpendicular to the plane of the trapezoidal flange section 94. The trapezoidal flange 94 is generally symmetrical about an imaginary vertical plane 96 in which the axis of the bore 95 lies. Opposite edges 97 of the trapezoidal flange 94 converge towards one another with reference to a direction of increasing distance above the axis of the bore 95 and diverge from one another in a direction of increasing distance below this bore axis. These non-parallel edges or surfaces 97 lie, preferably, in planes perpendicular to the planes of FIGS. 11 and 14. It is seen that the width of the trapezoidal flange 94 is smaller adjacent its top than at its bottom.

At a top edge 101 of the trapezoidal flange 94, there exists a lip or tab 102 which extends upwardly above the plane of such edge. With directional reference to the bore 95, the axial length of the lip 102 is somewhat limited and preferably is less than ½ the axial thickness of the trapezoidal flange section 94. An outer face 104 of the trapezoidal flange 94 is spaced inwardly from one end 106 of the tubular body 93. An inside face 103 of the flange 94 has a plurality of recesses 107 and integral stiffening ribs 108 that result in a part of generally uniform wall thickness which can be readily injection molded and which exhibits high mechanical strength.

Figure 4:
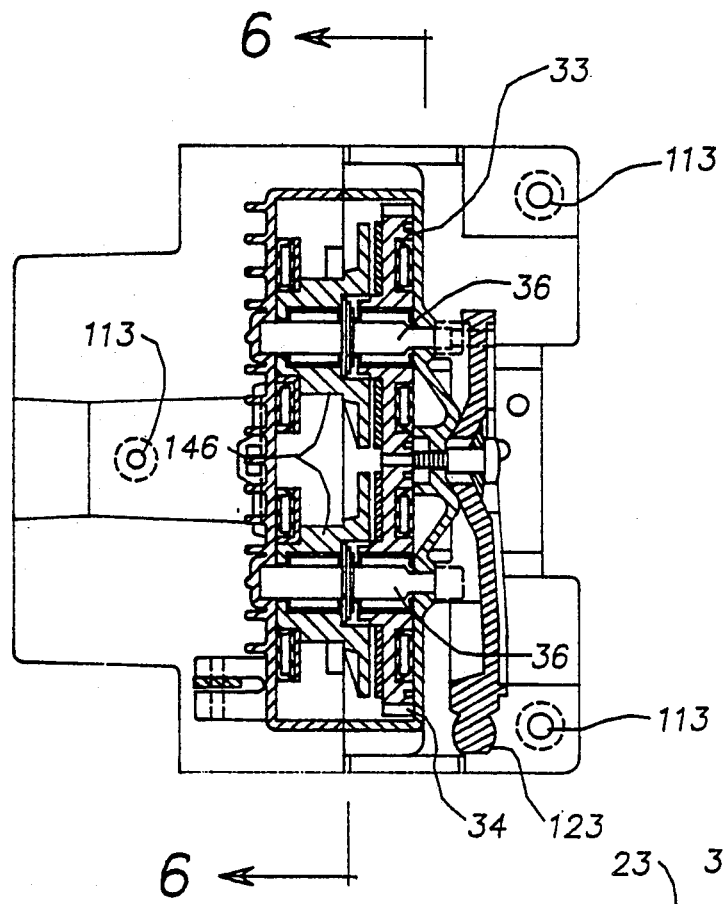
FIG. 4 is a cross-sectional view of the transmission taken in a horizontal plane indicated by the line 4—4 in FIG. 5.

As shown in FIG. 3, brackets 109 screwed to the casing 27 retain the bearings 92 in place with respect to the casing. Each bearing 92 is received in an associated one of a pair of slots 111 formed in a base section 112 of the vacuum cleaner housing 11. The transmission casing 27 is mounted on this base section 112 and retained thereon by suitable screws. The configuration of each slot 111 is complementary to the shape of its bearing 92 such that its edges wedge snugly against the corresponding edges 97 of its bearing flange 94. The transmission casing 27 is secured to the lower housing section 112 by screws assembled through holes 113 (FIG. 4) in horizontal flanges of the casing and aligned with threaded holes (not shown) in the section 112.

Figure 7:
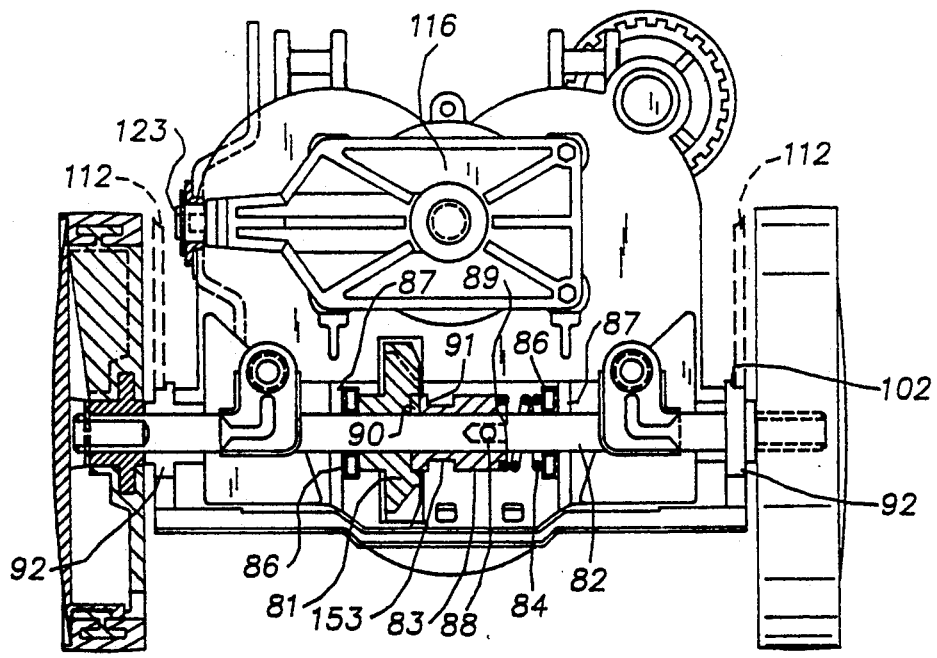
FIG. 7 is a rear view, partially in section, of the transmission and associated parts.

As the transmission casing 27 is drawn into assembled position, the bearings 92, through interaction with the surfaces of the slots 111, align themselves with the housing 112. The lips 102 fit inside the wall of the housing section 112 as indicated in FIG. 7 where the housing section is indicated in phantom. The lips 102 axially locate the bearings 92 with respect to the housing 112.

An actuator lever 116, is universally mounted in a spherical socket 117 integrally formed on a back wall of the casing 27. The lever 116 has a complementary spherical boss 118 that fits into the socket 117. A screw 119 extends through the axes of the socket 117 and boss 118 and retains the lever 116 with adequate clearance to allow limited pivotal movement of the lever on the casing 27. As shown in part in FIG. 3 and fragmentarily in FIG. 10, pins 121 integrally formed on the lever 116 at its four corners, project through associated holes 122 in the rear wall of the casing 27. The pins 121 operate in pairs with the pins on the right in FIG. 7 contacting the stationary race of the associated thrust bearing assembly 39 at diametrically opposed points equidistant from its center. Similarly, the pins 121 on the left contact the race of the other thrust bearing 39.

Figure 8:
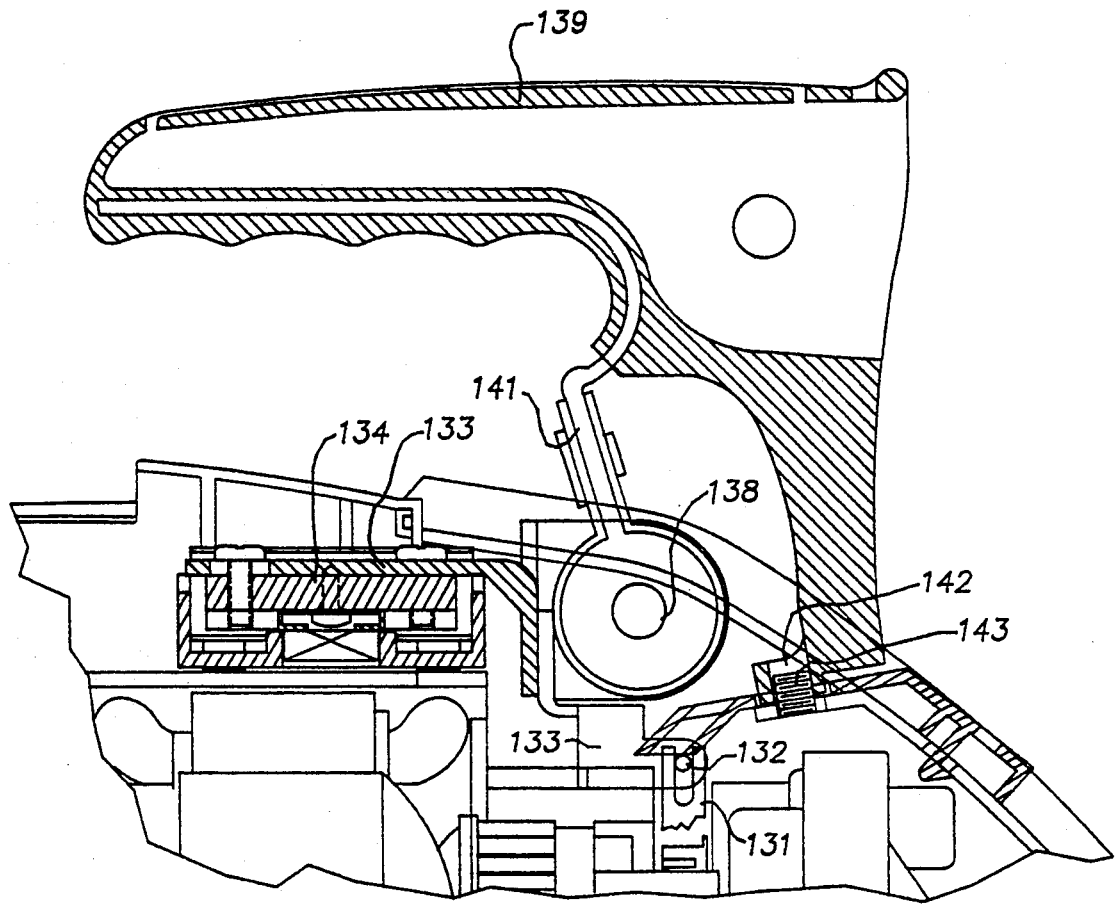
FIG. 8 is a fragmentary cross-sectional view on a enlarged scale of a portable handle installed on the housing and interlocked with elements to prevent energization of the transmission.
Figure 9:
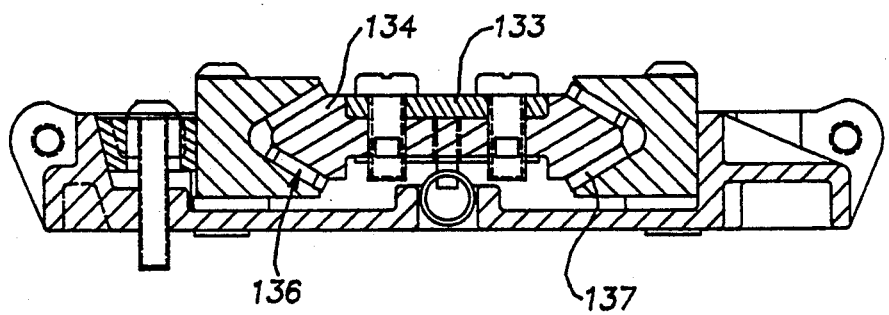
FIG. 9 is a cross-sectional view of a carriage on the housing for mounting the upright or portable handles of the vacuum cleaner.

A spherical projection 123 on the lever is coupled in a complementary socket of a horizontal link 124, FIG. 3. The link 124 at is opposite end is pivotally pinned at 126 to a vertical lever 127. At its lower end 128, the vertical lever 127 is pivotally pinned to a boss 129 on the casing 27, FIG. 2. An upper end 131 of the lever 127 is forked or slotted to receive a pin 132 fixed to a bracket 133 that, in turn, is fixed to a handle support carriage 134 (FIGS. 8 and 9).

The carriage 134 rides in a linear bearing assembly 136 rigidly mounted just inside the upper side of the housing 11. The linear bearing assembly 136 comprises a plurality of cylindrical rollers 137 in opposed V-shaped configurations that restrain the carriage 134 for translatory movement in a substantially horizontal plane.

The carriage 134 carries a pivot assembly 138 that supports the upright handle 13 for pivotal movement about a horizontal axis parallel to the wheel shaft 82. Alternatively, the pivot assembly 138 cooperates with a substitute handle 139 as is discussed more fully herein below and as is disclosed in U.S. patent application Ser. No. 282,116, filed Dec. 9, 1988, now U.S. Pat. No. 4,947,512, issued Aug. 14, 1990, the disclosure of which is incorporated herein by reference.

Pushing and pulling forces exerted on the handle 13 by the user energize the transmission 26 to provide power assist for propelling the cleaner 10 over a floor surface being cleaned. A pushing force on the handle 13 results in a limited forward displacement of the carriage 134 within the housing 11. Movement of the carriage 134 is transferred by the lever 127 and link 124 to a forward displacement of the left end of the actuating lever 116 as viewed in FIG. 7. The pins 121 on the left of the pivot screw 119 press against the associated thrust bearing 39 causing slight axial displacement of such thrust bearing and the associated gear 34. This movement brings the associated friction facing material 37 into engagement with the associated clutch/sprocket member 46 causing this clutch/sprocket member to adopt the rotation of the gear 34. The belt 63 causes the sprocket/gear 71 to rotate in a like direction. The bevel gear 76 cooperating with the wheel shaft bevel gear 81 converts this rotation into rotation of the wheel shaft 82 in a forward direction.

When the handle 13 is pulled, the pins 121 on the right in FIG. 7 are effective to cause powered rotation of the other clutch/sprocket member 46 associated with the gear 31. Since this rotation is opposite that of the gear 34, the wheel shaft is driven in a reverse direction by means of the associated clutch/sprocket member 46, belt 63, sprocket/gear 71 and bevel gear 81.

Figure 15:
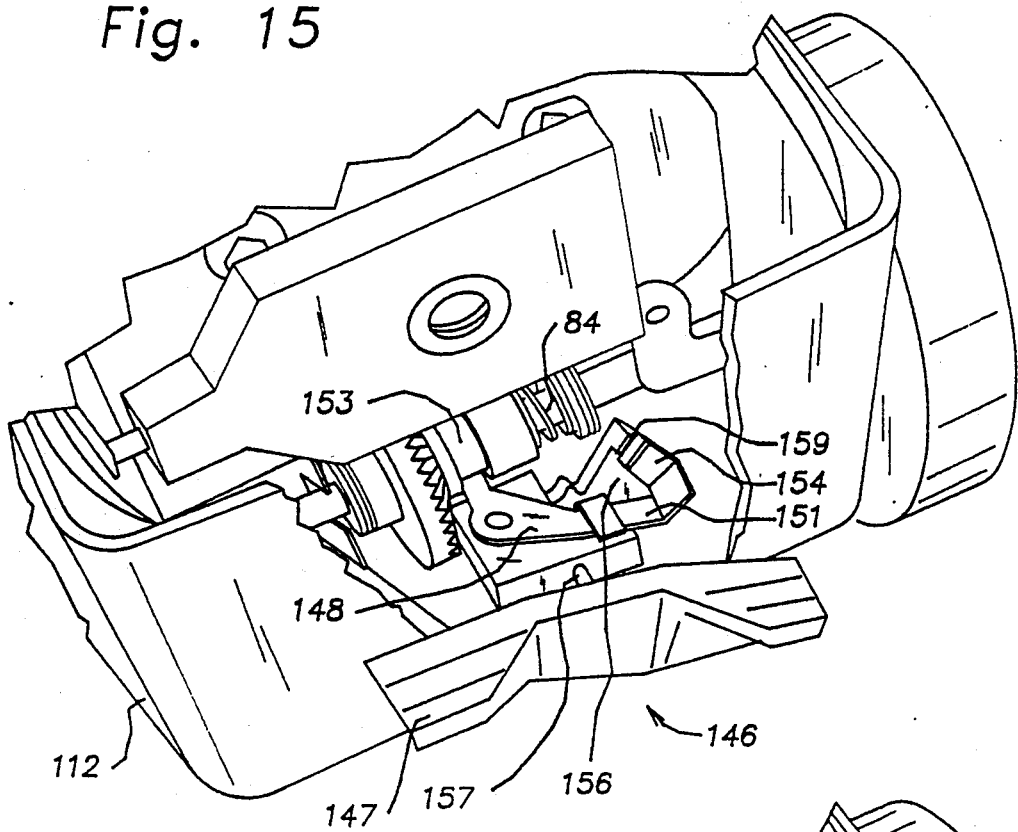
FIG. 15 is a somewhat schematic perspective view of a foot pedal mechanism for controlling drive from the transmission to the wheel shaft and illustrating the mechanism in a power transmitting position.
Figure 16:
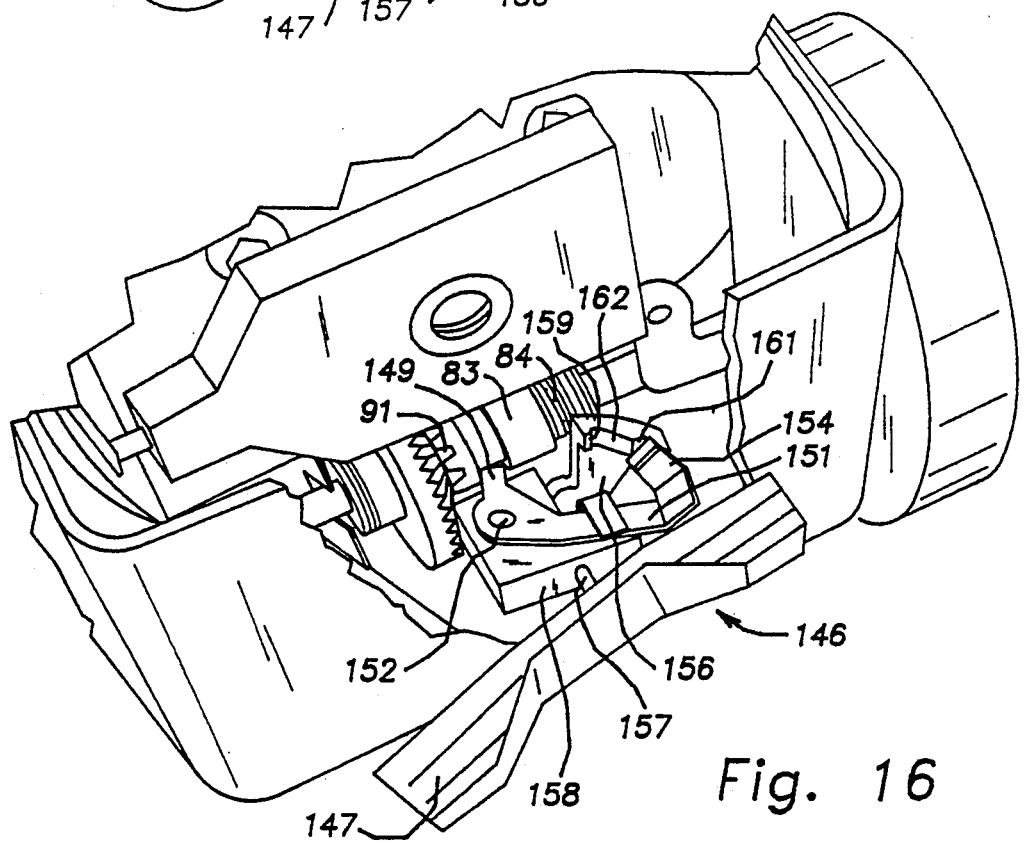
FIG. 16 is a view similar to FIG. 15 but showing the pedal mechanism in a neutral position.

FIGS. 15 and 16 illustrate a foot pedal operated mechanism 146 which selectively shifts the coupling body 83 from its normally engaged power transmitting position to a neutral position where the wheel shaft 82 is free of a positive torque transmitting connection with the transmission 26. A foot pedal 147 of the mechanism 146 is exposed at a lower rear side of the housing 11; the mechanism 146 is not shown in FIG. 3 so that other parts can be clearly seen. The mechanism 146 includes a bell crank 148 with arms 149 and 151 pivotal about a vertical pin 152 that is fixed to a lower surface of the transmission casing 27. One of the arms 149 is received in a peripheral groove 153 in the coupling body 83. The other arm 151 has a cam follower tab 154 which is engaged by a barrel cam segment 156. The cam segment 156 is fixed to a horizontal shaft 157 that pivots in a block 158 fixed on the casing 27. The horizontal shaft 157 projects rearwardly beyond the housing 11 and the pedal 147 is fixed to its outer or rearward end. The cam segment 156 includes two flat areas 159, 161 and an intermediate shifting area 162.

By stepping on the right side of the pedal 147 (as viewed in FIGS. 15 and 16) the user can manually engage the transmission 26. In this condition, the flat area 159 of the cam 156 allows the follower tab 154 to assume a position where the bell crank arm 149 permits the spring 84 to normally press the coupler body teeth 91 into interengagement with the bevel gear teeth 90. When the left side of the pedal 147 is manually depressed, the cam 156 rocks and the follower tab 154 slides across the shifting area 162 to the flat area 161. In this condition, shown in FIG. 16, the follower tab 154 forces the bell crank arm 149 to the right to move the coupler body 83 against the spring 84 and the teeth 90, 91 out of engagement leaving the transmission in a neutral state where there is no active rotary connection between it and the wheel shaft 82. The flat areas 159, 161 are oriented so that they each support the follower tab 154 in a stable or self-maintaining position.

The biasing springs 68 associated with the clutch/sprocket members 46 are calibrated to provide a desired resistance against energization of their respective clutch elements. Their spring rates and state of pre-compression in assembly will ordinarily be different from one another so that a preferred response of the transmission to manual pushing effort and, alternatively, manual pulling effort on the handle can be selected for a good user feel. It will be understood that the disclosed linkage and actuating kinematics are such that with appropriate selection of the springs 68 the pushing force required to develop forward clutch engaging action is independent of that required for pulling force for reversing and vice versa. It will also be understood that the various linkage and clutching elements are free of significant sensitivity to wear so that the feel and response of the cleaner to the user remains constant throughout the life of the product.

With reference to FIG. 8, when it is desired to operate the cleaner 10 in a portable mode and rotation of the rear traction wheels 16 is to be avoided, the substitute portable handle 139 is used. This handle 139 has a blade 141 which engages the pivot assembly 138 and has a socket 142 which closely engages a head of a screw 143 fixed to the housing 11. The handle 139 thus locks the pivot assembly 138 and therefore the carriage 134 against horizontal movement. This locking action prevents the linkage elements 127 and 124 from energizing the transmission.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

We claim:

1. A self-propelled vacuum cleaner comprising a housing mounted on wheels and manipulated by a handle extending upwardly from the housing, a drive system within the housing for driving the wheels of the cleaner selectively in forward or reverse directions, the drive system including a motor, a pair of mutually intermeshed gears supported in the housing for counter-rotation about respective parallel axes, means driving the gears in rotation with power from the motor, an output element associated with each gear to form a set, means supporting each output element in confronting relation to the respective gear of a set for rotation about the axis of the respective gear, clutching surfaces for each gear and output element set, a common output element supported for rotation about an axis parallel to said gear axes, a belt trained around both of said associated output elements and said common output element, and output shaft operatively connected to said common output element and two said wheels to drive said wheels in directions determined by the rotational direction of the output elements, clutch acutator means responsive to manual forces on the handle to clutch one set of said gears and output elements together through their respective clutching surfaces to drive said output elements in a first rotary direction when a manual force is applied on the handle in a corresponding first direction and responsive to a manual force on the handle to clutch the other set of said gears and output elements through their respective clutching surfaces to drive said output elements in a second rotary direction whereby the clutch actuator means functions to cause said output shaft to selectively drive said wheels in either forward or reverse directions.

2. A vacuum cleaner as set forth in claim 1, wherein the clutch actuation means includes a linkage on said housing responsive to manual forces on said handle.

3. A vacuum cleaner as set forth in claim 2, wherein a carriage is mounted on said housing for supporting said handle and allowing limited movement of said handle relative to said housing, said carriage being restrained to translation in a generally horizontal plane.

4. A vacuum cleaner as set forth in claim 3 wherein said handle adjacent its lower end is pivotally connected to the carriage to permit pivotal movement of said handle about an axis parallel to the axis of said wheels.

5. A vacuum cleaner as set forth in claim 1, including a suction fan within the housing, said motor being arranged to drive said suction fan.

6. A vacuum cleaner as set forth in claim 1, wherein said driving means includes a pinion mounted for rotation about an axis parallel to said gear axis and in engagement with one of said gears.

7. A vacuum cleaner as set forth in claim 6, wherein said motor has a shaft mounted in said housing, said motor shaft having an output element mounted thereon, said pinion having an associated output element, and a belt trained over said motor shaft output element and said pinion associated output element, said belt transferring power from said motor to said pinion.

8. A self-propelled vacuum cleaner comprising:
 a) a housing mounted on wheels and manipulatable by a handle extending upwardly from the housing;
 b) a drive system within the housing for driving at least one of the wheels of the cleaner selectively in forward or reverse directions;
 c) the drive system including a motor, a pair of gears supported in the housing and respectively connected to the motor for counter-rotation about respective axes, a pair of transmission output elements respectively mounted in confronting relationship and associated with the gears to form a pair of sets, and a driven element;
d) pairs of clutching surfaces, one pair for each gear and output element set;
e) flexible power transmission means trained around both of said output elements and said driven element;
f) a shaft operatively connected to said driven element and adapted to drive said at least one wheel in directions determined by the rotational direction of output elements;
g) clutch actuator means responsive to manual forces on the handle to clutch one of said gear and output element sets together through its respective clutching surfaces to drive said driven element in a first rotary direction when a manual force is applied on the handle in a corresponding first direction and responsive to a manual force on the handle to clutch the other said gear and output element set through its respective clutching surfaces to drive said driven element in a second opposite rotary direction whereby the clutch actuator means functions to cause said shaft to selectively drive said at least one wheel in either forward or reverse directions.

9. A vacuum cleaner as set forth in claim 8, wherein the clutch actuation means includes a linkage on said housing responsive to manual forces on said handle.

10. A vacuum cleaner as set forth in claim 8, wherein a carriage means is mounted on said housing for supporting said handle and allowing limited movement of said handle relative to said housing.

11. A vacuum cleaner as set forth in claim 8, wherein said handle adjacent its lower end is pivotally connected to the carriage to permit pivotal movement of said handle about an axis parallel to the axis of said wheels.

12. A vacuum cleaner as set forth in claim 8, including a suction fan within the housing, said motor being arranged to drive said suction fan.

13. In a power assisted vacuum cleaner including a housing, an improved transmission and control comprising:
a) transmission;
b) a handle support carriage reciprocatably journaled in the housing and shiftable from a neutral position in a direction forwardly from the neutral position to effect forward drive of the cleaner, the carriage being shiftable from the neutral position to effect rearward drive of the cleaner;
c) a handle pivotally connected to the carriage to impart operator supplied forces to the carriage to shift the carriage from the neutral position selectively forwardly when the operator forces are in a forward direction and rearwardly when the operator supplied forces are in a rearwardly direction;
d) a transmission activator lever universally connected to the transmission for a pivoted movement in one direction to effect forward movement of the cleaner and in the opposite direction to effect rearward movement; and
e) a linkage interconnecting the carriage and the lever for transmitting operator supplied forces from the carriage to the lever.

14. The vacuum cleaner of claim 13 wherein the transmission has an output when in use which drives at least one wheel and the transmission includes means to vary its output in proportion to operator applied forces.

15. The vacuum cleaner of claim 13 wherein the carriage is journaled on rollers.

16. The vacuum cleaner of claim 13 including interchangeable handles selectively connected one at a time to the carriage, one of the handles including means to prevent carriage movement from the neutral position.

* * * * *